Figures 1, 2, 3:
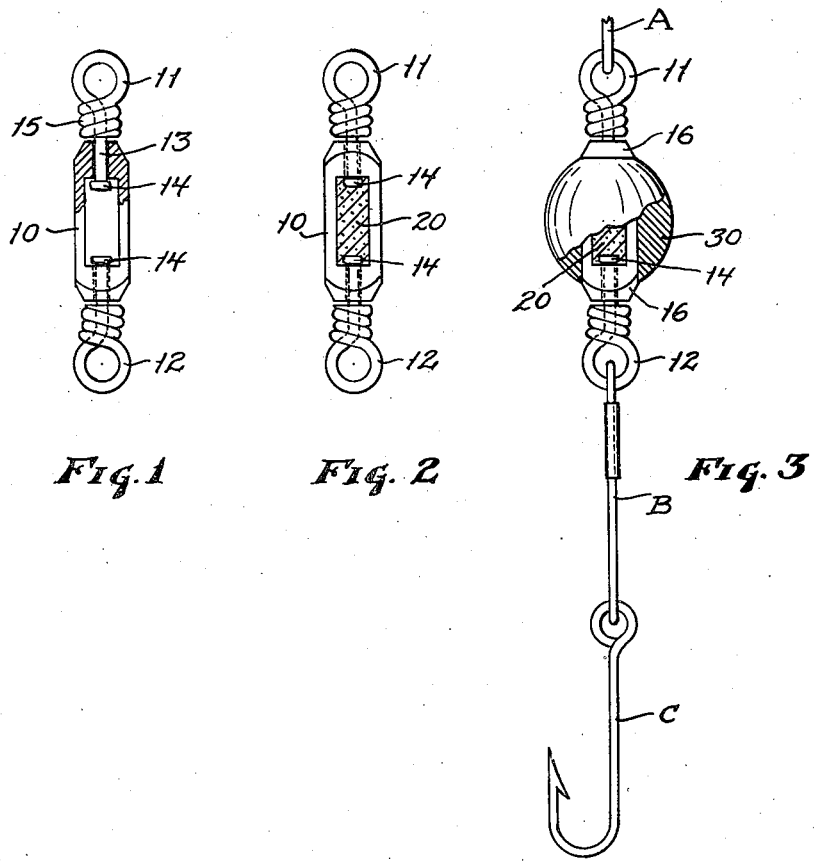

March 9, 1943. F. KNILL ET AL 2,313,647
SWIVEL SINKER
Filed Oct. 27, 1941

INVENTOR.
Frank Knill and John A. Schulte,
BY Bates, Teare & McBean
Attorneys.

Patented Mar. 9, 1943

2,313,647

UNITED STATES PATENT OFFICE 2,313,647

SWIVEL SINKER

Frank Knill and John A. Schulte, Vermillion, Ohio, assignors, by mesne assignments, to Charles W. Patterson, Cleveland, Ohio Application October 27, 1941, Serial No. 416,658

2 Claims. (Cl. 43—52)

This invention relates to a combined sinker and swivel adapted for use with fishing tackle. Such devices have the advantage of bringing the sinker nearer the hook, as well as holding it more securely, than where it is clamped on the line or otherwise attached directly thereto. The object of the invention is to provide a swivel sinker in a form which may be cheaply constructed and shall not interfere with swiveling action and shall be smooth on the exterior, so as not to become tangled with weeds.

To the above ends, we have devised a combined swivel and sinker employing the usual swivel consisting of two wire loops and an open yoke in which the shanks of the loops are journalled, with the inner ends of the shanks upset within the opening of the yoke, while cast about the yoke is a ball of lead providing the necessary weight for the sinker.

To prevent the lead passing into the interior of the yoke and thereby preventing the wire loops from swiveling, we first fill the open space of the yoke with some plastic material having only limited adhering power, putty for example, then cast the lead ball in a two-part mold embracing the yoke. The putty or like material prevents the lead from passing into the interior of the yoke or reaching the wire loops. The putty remains in place in the yoke within the ball, but after the cast is completed and the lead cooled a slight twisting force applied to the swivel loops will break the heads thereof free from the putty, and thereafter the loops will swivel perfectly freely in the yoke, the same as before the lead ball embracing the yoke was put in place.

Our invention is illustrated in the drawing hereof and is more fully hereinafter described and the essential novel features are set out in the claims.

In the drawing, Fig. 1 is a side elevation, partly in section, of the swivel which is employed in the sinker; Fig. 2 is a side elevation of the swivel with the filling material in the yoke thereof; Fig. 3 is an elevation, partly broken away, of the complete sinker showing also a fish line and hook connected with the sinker.

In each of the views, 10 indicates the usual brass yoke of a swivel and 11 and 12 the two wire loops, each loop terminates in a shank 13. This shank extends freely through a larger opening at the end of the yoke, the final end of the shank having an upset head 14. The other end of the wire loop is usually twisted around the shank, as shown at 15.

We take such a swivel, as shown in Fig. 1, and we fill the interior of the yoke with putty, as shown at 20 in Fig. 2. The putty forces the heads on the shanks against the inner surfaces of the yoke ends and surrounds such heads but does not enter the bearings for the shanks. We then place the yoke portion of the swivel in a two-part mold and cast about it a body of lead which is substantially a sphere, as indicated at 30 in Fig. 3.

The lead entirely embraces the yoke, terminating slightly short of the ends thereof, leaving the substantially conical end portions 16 of the standard yoke at the poles of the sphere. The putty 20, within the yoke, prevents any of the lead passing into the interior thereof, hence, no lead reaches any portion of the wire loops. After the casting has cooled, the putty at first tends to retain the wire loops somewhat against turning, but a slight twisting force applied to them will break the inner end free from the putty, so that the two loops will thereafter swivel in the brass yoke the same as if no lead were applied. Our experience indicates that the heat of the molten lead dries the putty and tends to crumble it, thus reducing its adherence to the heads of the swivel loops.

It will be seen from Fig. 3, that the exterior of the lead sphere is entirely smooth, and that it forms a close connection with the conical head ends of the yoke, so that the device presents nothing to tangle with weeds. In Fig. 3 we have indicated at A a fish line attached at one of the swivel loops, at B the usual looped attaching pin, and at C a fish hook.

It has been proposed to cast a lead body directly about the shanks of swiveling loop, the shanks being covered with plumbago to prevent the lead adhering thereto at the time of the casting. Such devices, however, are not satisfactory in practice as the lead is likely to become pressed on the shank; also subsequent accumulation of the lead oxide or other material on the lead surface about the shank tends to bind the latter. Experience has shown that brass shanks in brass yokes provide the most satisfactory swivel. In our swivel sinker the lead never touches the swivel loops or their shanks, and the device, accordingly, retains its free swiveling action.

We claim:

1. A swivel sinker comprising an open yoke having two end portions with axial openings therein, two swivel loops having shanks occupying the axial openings, the shanks having heads within the main opening of the yoke, a material substantially filling the open space of the yoke, and a weight cast about the yoke surrounding it and adhering thereto but prevented by the filling material from reaching the shanks of the loops.

2. A swivel sinker comprising an open yoke having side members and end members spaced apart, the exterior of the yoke being conical at the ends and there being axial openings through such ends, a pair of swivel eyes having shanks occupying the axial openings, the inner ends of the shanks being formed with heads in the open space within the yoke, putty filling such open space, and a lead ball cast as a single member about the exterior of the yoke and extending from the conical portion at one end to the conical portion of the other.

FRANK KNILL.
JOHN A. SCHULTE.